Patented Mar. 22, 1949

2,465,303

UNITED STATES PATENT OFFICE 2,465,303

LACTONES

Roger J. Williams, Austin, Tex., assignor to Research Corporation, New York, N. Y., a corporation of New York No Drawing. Original application April 3, 1939, Serial No. 265,799. Divided and this application February 19, 1942, Serial No. 431,531

7 Claims. (Cl. 260—344)

This invention relates to lactones and particularly to the lactone obtained by hydrolytic splitting of pantothenic acid obtained from natural sources.

This application is a division of my copending application Serial No. 265,799, filed April 3, 1939, for Preparation of growth promoting substances.

Substances having the physiological activity of pantothenic acid may be obtained by condensing β-alanine or derivatives thereof, such as its esters and salts, with certain lactones. Among the lactones that have proven useful for this purpose is the lactone obtained by hydrolytic splitting of pantothenic acid obtained from natural sources.

The object of this invention is to provide lactones suitable for use in the preparation of substances having the physiological properties of pantothenic acid.

In accordance with the invention, pantothenic acid is obtained from natural sources in relatively concentrated form, preferably as an alkali metal salt. This concentrate is then subjected to hydrolysis by treatment with an acid or alkali, whereupon the acid is split into less complicated substances, one of which is a lactone.

In accordance with one specific embodiment of the invention, the autolysate from sheep liver is treated with fuller's earth to remove basic substances, then brought to about pH 3.5 and the physiologically active acid adsorbed by Norite charcoal. This is eluted with dilute ammonia, neutralized, and evaporated to dryness in the presence of brucine alkaloid, brucine oxalate, and infusorial earth. This dry material is ground and extracted with chloroform and the chloroform extracted with a small proportion of water. The resulting brucine salts, which include the brucine salt of pantothenic acid, are subjected to an elaborate fractionation procedure involving distribution between the two immiscible solvents, water and chloroform. The fractions are tested for physiological activity during the process.

The concentrated brucine salts are converted into calcium salts by shaking with lime water and the brucine removed by chloroform extraction. The calcium salts are further fractionated according to the degree of purity desired, using mercuric chloride to remove impurities, and various solvents for fractional precipitation. More details of the elaborate process are given in the following reference:

R. J. Williams, J. R. Truesdail, H. H. Weinstock, Jr., E. Rohrmann, G. M. Lyman, and C. H. McBurney. Journal American Chemical Society, vol. 60, p. 2719, 1938.

The crude calcium salt of pantothenic acid thus obtained is hydrolyzed by dissolving it in normal hydrochloric acid and heating the solution for 1½ hours at 100° C. The resulting solution is evaporated to dryness at 50° and the residue containing the crude lactone is allowed to react with an excess of β-alanine-ethyl ester for 18 hours at 5°. The resulting product, after hydrolysis of the ester linkage, possesses very high potency for stimulating the growth of yeast or *Streptococcus lactis*. A salt of β-alanine can be condensed with this lactone, if desired, instead of a β-alanine ester.

The substance used in this example for condensation with an ester or salt of β-alanine is a lactone because although it is neutral it combines with alkali like an acid and on warming the alkali metal salt with dilute mineral acid the original neutral substance is regenerated. It contains an α-hydroxy group because on heating with concentrated sulphuric acid at about 140° for one hour it yields approximately one mole of carbon monoxide for one equivalent of substance used. This has been found to be a quantitative method for determination of α-hydroxy acids.

The molecular weight of pantothenic acid from which the aforementioned lactone is derived and the oxidation equivalent of pantothenic acid, exclude the probability that the lactone portion of the molecule contains more than six carbon atoms. The crude lactone, above described, may be purified by distillation in a molecular still. When so purified, it reacts with β-alanine and derivatives thereof to form a product indistinguishable from pantothenic acid in respect to its physiological action.

This lactone is the laevo rotary form of α-hydroxy-β, β-dimethyl-γ-butyro lactone, having the formula

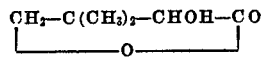

What is claimed is:

1. The laevo rotary form of α-hydroxy-β, β-dimethyl-γ-butyro lactone substantially free from the dextro rotary form.

2. The process which comprises hydrolytically splitting an alkaline earth metal salt of physiologically active pantothenic acid to sever the carbonyl-amino linkage therein.

3. The process which comprises hydrolytically splitting the calcium salt of physiologically active pantothenic acid obtained from a natural source to sever the carbonyl-amino linkage therein.

4. The process which comprises hydrolytically splitting a concentrate of the calcium salt of physiologically active pantothenic acid obtained from a natural source to sever the carbonyl-amino linkage therein.

5. The process which comprises hydrolytically splitting with an acid an alkaline earth metal salt of physiologically active pantothenic acid to sever the carbonyl-amino linkage therein.

6. The process which comprises hydrolytically splitting with an acid the calcium salt of physiologically active pantothenic acid obtained from a natural source to sever the carbonyl-amino linkage therein.

7. The process which comprises hydrolytically splitting with an acid a concentrate of the calcium salt of physiologically active pantothenic acid obtained from a natural source to sever the carbonyl-amino linkage therein.

ROGER J. WILLIAMS.

REFERENCES CITED

The following references are of record in the file of this patent:

Gilman, Organic Chemistry, vol. 1 (1938), J. Wiley & Sons, pages 176, 187–196, 155, 159.

Levine and Haller, J. Biological Chem., vol. 69, page 165 (1926).

Journal American Chem. Society, vol. 62, pp. 1779–1784, July 1940.

Monatschefte fur Chemie, vol. 39, pp. 295–296.

Monatschefte fur Chemie, vol. 25, pp. 46–54 (Glaser).